(12) United States Patent
Kakaiya et al.

(10) Patent No.: US 12,271,616 B2
(45) Date of Patent: Apr. 8, 2025

(54) INDEPENDENTLY CONTROLLED DMA AND CPU ACCESS TO A SHARED MEMORY REGION

(71) Applicant: Intel Corporation, Santa Clara, CA (US)

(72) Inventors: Utkarsh Y. Kakaiya, Folsom, CA (US); David Koufaty, Portland, OR (US); Rajesh Sankaran, Portland, OR (US); Vedvyas Shanbhogue, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 710 days.

(21) Appl. No.: 17/348,586

(22) Filed: Jun. 15, 2021

(65) Prior Publication Data

US 2022/0398017 A1    Dec. 15, 2022

(51) Int. Cl.
*G06F 3/06* (2006.01)
*G06F 13/28* (2006.01)

(52) U.S. Cl.
CPC ............ *G06F 3/065* (2013.01); *G06F 3/0604* (2013.01); *G06F 3/0679* (2013.01); *G06F 13/28* (2013.01)

(58) Field of Classification Search
None
See application file for complete search history.

(56) References Cited

U.S. PATENT DOCUMENTS

| | | | | |
|---|---|---|---|---|
| 10,447,728 | B1* | 10/2019 | Steinberg | ............... H04L 63/10 |
| 2015/0269091 | A1* | 9/2015 | Horovitz | ............... G06F 12/126 |
| | | | | 711/162 |
| 2017/0329979 | A1* | 11/2017 | Behl | ....................... G06F 21/74 |
| 2019/0042463 | A1* | 2/2019 | Shanbhogue | ....... G06F 12/1408 |
| 2019/0361728 | A1* | 11/2019 | Kumar | ............... G06F 12/1009 |
| 2020/0019515 | A1 | 1/2020 | Koufaty et al. | |
| 2020/0310665 | A1* | 10/2020 | Hansen | ................ G06F 3/0622 |
| 2021/0026543 | A1 | 1/2021 | Trikalinou et al. | |

OTHER PUBLICATIONS

"Intel Virtualization Technology for Directed I/O", Architecture Specification, Apr. 2021, Revision 3.3, 295 pgs.

\* cited by examiner

*Primary Examiner* — Edward J Dudek, Jr.
*Assistant Examiner* — Ralph A Verderamo, III
(74) *Attorney, Agent, or Firm* — Essential Patents Group, LLP

(57) ABSTRACT

An embodiment of an integrated circuit comprises circuitry to share page tables associated with a page between a processor memory management unit (MMU) and an input/output memory management unit (IOMMU), store a page table entry in the memory associated with the page, and separately control access to the page from a processor and from a direct memory access (DMA) request based on one or more fields of the stored page table entry. Other embodiments are disclosed and claimed.

20 Claims, 13 Drawing Sheets

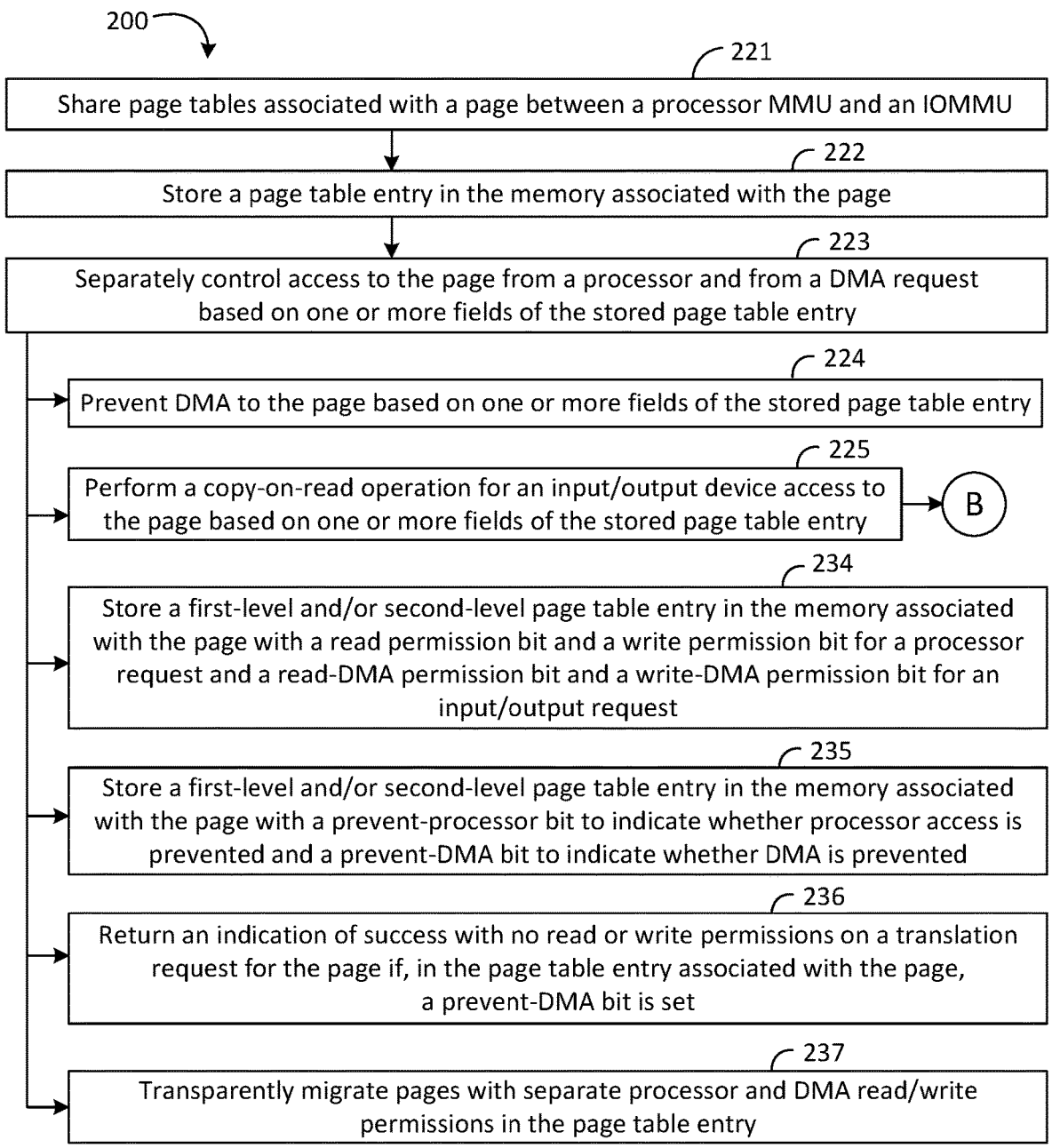

50 ⤵

| XD | Prot. Key | Ign | Rsvd | Address of 4KB page frame | Ign | BD | G | PAT | D | A | PCD | PWT | U/S | R/W | 1 | PTE: 4KB page |
|----|-----------|-----|------|---------------------------|-----|----|---|-----|---|---|-----|-----|-----|-----|---|----------------|

| Ign | DW | DR | Ignored | Rsvd | Address of 4KB page frame | SNP | Ign | D | A | Ign | IPAT | EMT | X | W | R | SL-PTE: 4KB page |
|-----|----|----|---------|------|---------------------------|-----|-----|---|---|-----|------|-----|---|---|---|-------------------|

| XD | Prot. Key | Ign | Rsvd | Address of 4KB page frame | BC | Ign | BD | G | PAT | D | A | PCD | PWT | U/S | R/W | 1 | PTE: 4KB page |
|----|-----------|-----|------|---------------------------|----|-----|----|---|-----|---|---|-----|-----|-----|-----|---|----------------|

| 63 | 62 | 61 | ... | 52 | 51 | ... | HAW | HAW-1 | ... | 12 | 11 | 10 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|
| Ign | BD | Ignored | | | Rsvd | | | Address of Second-level-PML4 table | | | Rsvd | Ign | | A | Rsvd | Ignored | | | | X | W | R | SL-PML5E |
| Ign | BD | Ignored | | | Rsvd | | | Address of Second-level-page-directory-pointer table | | | Rsvd | Ign | | A | Rsvd | Ignored | | | | X | W | R | SL-PML4E |
| Ign | BD | Ignored | | | Rsvd | | | Address of 1GB page frame | | Rsvd | | SNP | Ign | D | A | 1 | IPAT | EMT | | | X | W | R | SL-PDPE: 1GB page |
| Ign | BD | Ignored | | | Rsvd | | | Address of Second-level-page-directory table | | | Rsvd | Ign | | A | 0 | Ignored | | | | X | W | R | SL-PDPE: page directory |
| Ign | BD | Ignored | | | Rsvd | | | Address of 2MB page frame | | Rsvd | | SNP | Ign | D | A | 1 | IPAT | EMT | | | X | W | R | SL-PDE: 2 MB page |
| Ign | BD | Ignored | | | Rsvd | | | Address of Second-level-page table | | | Rsvd | Ign | | A | 0 | Ignored | | | | X | W | R | SL-PDE: page table |
| Ign | BD | Ignored | | | Rsvd | | | Address of 4KB page frame | | | | SNP | Ign | D | A | Ign | IPAT | EMT | | | X | W | R | SL-PTE: 4KB page |

FIG. 8

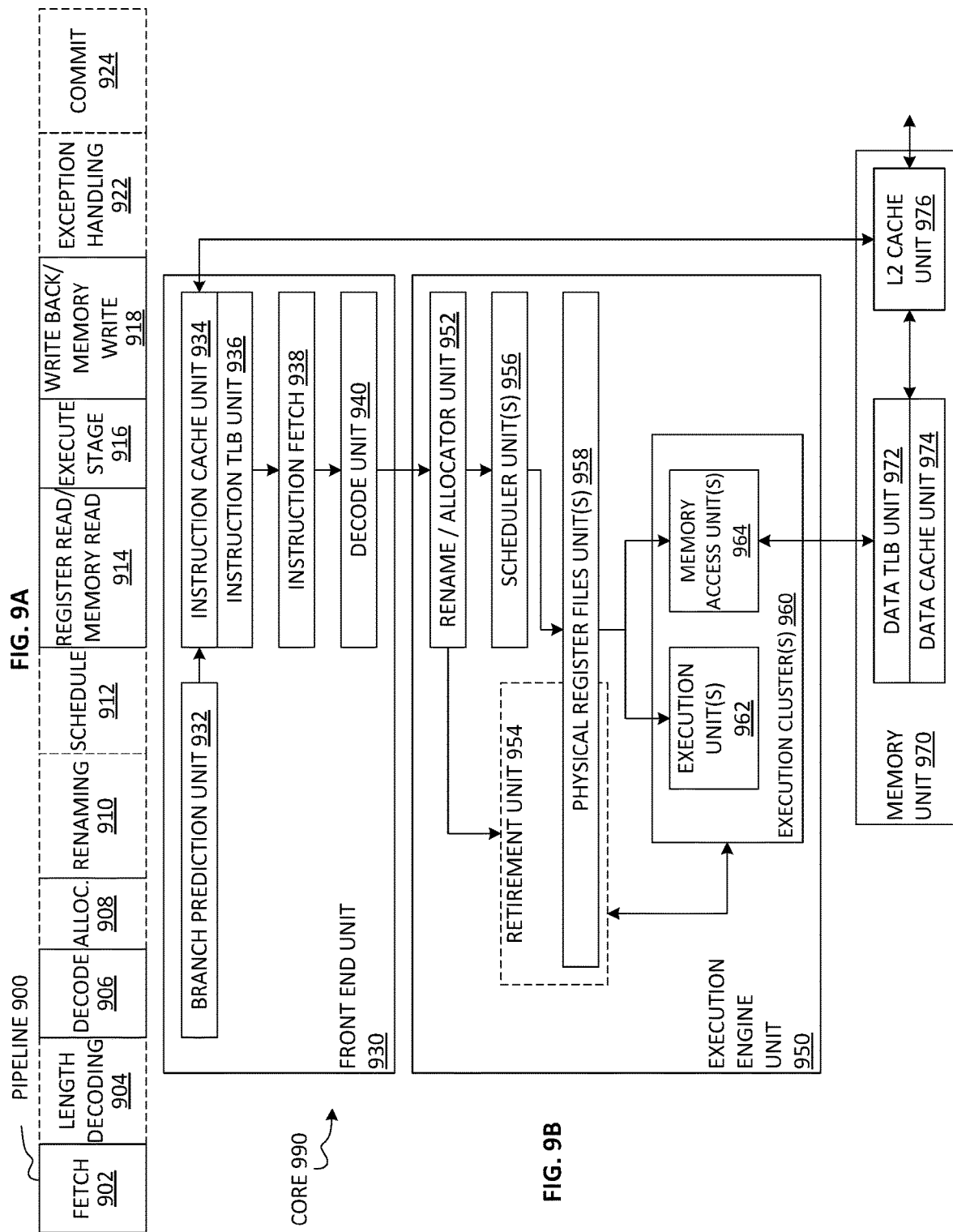

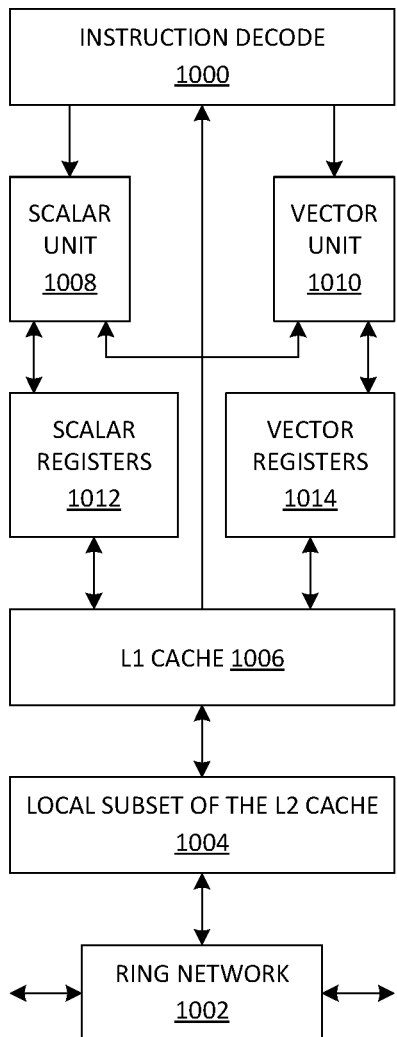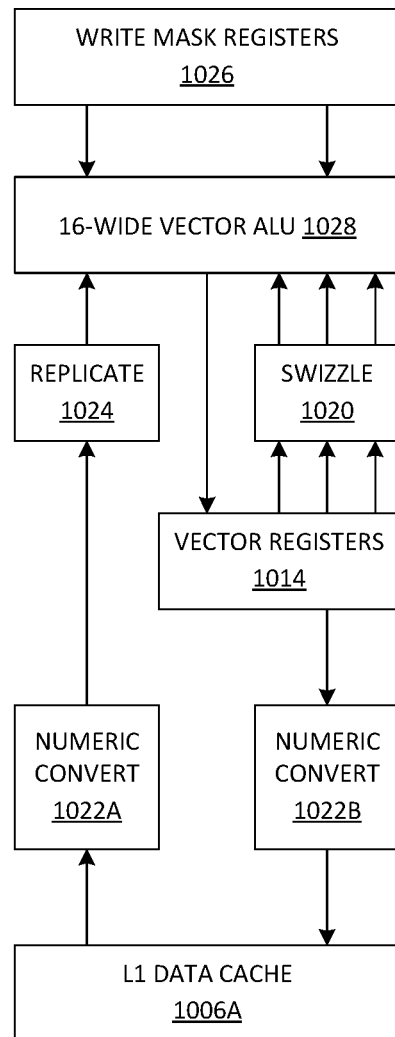
FIG. 10A
FIG. 10B

INDEPENDENTLY CONTROLLED DMA AND CPU ACCESS TO A SHARED MEMORY REGION

BACKGROUND

1. Technical Field

This disclosure generally relates to memory technology, and more particularly to memory management technology.

2. Background Art

Most modern computer systems use memory virtualization for optimal memory usage and security. Traditionally, Peripheral Component Interconnect Express (PCIe) devices would only observe untranslated addresses instead of a Host Physical Addresses (HPA), and would send a read or write request with a given untranslated address. On the host side, the processor's input/output memory management unit (IOMMU) would receive a read/write request from a device, translate the specified address to an HPA and complete the device's memory access (read/write). In order to isolate devices only to specific addresses, software would program the device and the IOMMU to use untranslated address that are, for example, a Virtual Addresses (VA) or an Input/Output Virtual Address (IOVA). The HPA is the physical address used to access all platform resources, after all address translations have taken place, including any translation from Guest Physical Address (GPA) to HPA or from Guest Virtual Address (GVA) to GPA to HPA in a virtualized environment, and it is usually referred simply as a Physical Address (PA) in a non-virtualized environment.

Address Translation Services (ATS) is an extension to the PCIe protocol. The current version of ATS is part of the PCIe specification, which is maintained by the PCI Special Interest Group (PCI-SIG) and which can be accessed by members at https://pcisig.com/specifications/ may be referred to herein as the "ATS Specification". ATS among other things, allows devices to cache address translations and to handle page faults (traditional PCIe devices required memory pinning), which facilitates support for a variety of performance features, including Device Translation Lookaside Buffer (Dev-TLB) and Shared Virtual Memory. ATS also provides support for cache-coherent links like Computer Express Link (CXL) that operate exclusively on physical address. ATS allows a PCIe device to request address translations, from VA to HPA, from a translation agent (e.g., the IOMMU). This capability allows the device to store the resulting translations internally in a Dev-TLB, also referred to by the ATS Specification as an address translation cache (ATC), and directly use the resulting HPA to subsequently access main memory, via a host-to-device link (e.g., a PCIe interface or a cache-coherent interface (e.g., CXL, NVLink, and Cache Coherent Interconnect for Accelerators (CCIX)). As such, ATS splits a legacy PCIe memory access into multiple stages, including (i) a Translation Request in which the device requests a translation for a VA to a HPA; (ii) a Translated Request in which the device requests a read/write with a given HPA; and (iii) an optional Page Request in which the device makes a request to the IOMMU for a new page to be allocated for it after a failed Translation Request.

BRIEF DESCRIPTION OF THE DRAWINGS

The various embodiments of the present invention are illustrated by way of example, and not by way of limitation, in the figures of the accompanying drawings and in which:

FIG. 1 is a block diagram of an example of an integrated circuit according to an embodiment;

FIGS. 2A to 2B are flow diagrams of an example of a method according to an embodiment;

FIGS. 4 to 8 are illustrative diagrams of examples of respective page table entries according to respective embodiments;

FIG. 9A is a block diagram illustrating both an exemplary in-order pipeline and an exemplary register renaming, out-of-order issue/execution pipeline according to embodiments of the invention;

FIG. 9B is a block diagram illustrating both an exemplary embodiment of an in-order architecture core and an exemplary register renaming, out-of-order issue/execution architecture core to be included in a processor according to embodiments of the invention;

FIGS. 10A-B illustrate a block diagram of a more specific exemplary in-order core architecture, which core would be one of several logic blocks (including other cores of the same type and/or different types) in a chip;

DETAILED DESCRIPTION

Figure 2B:
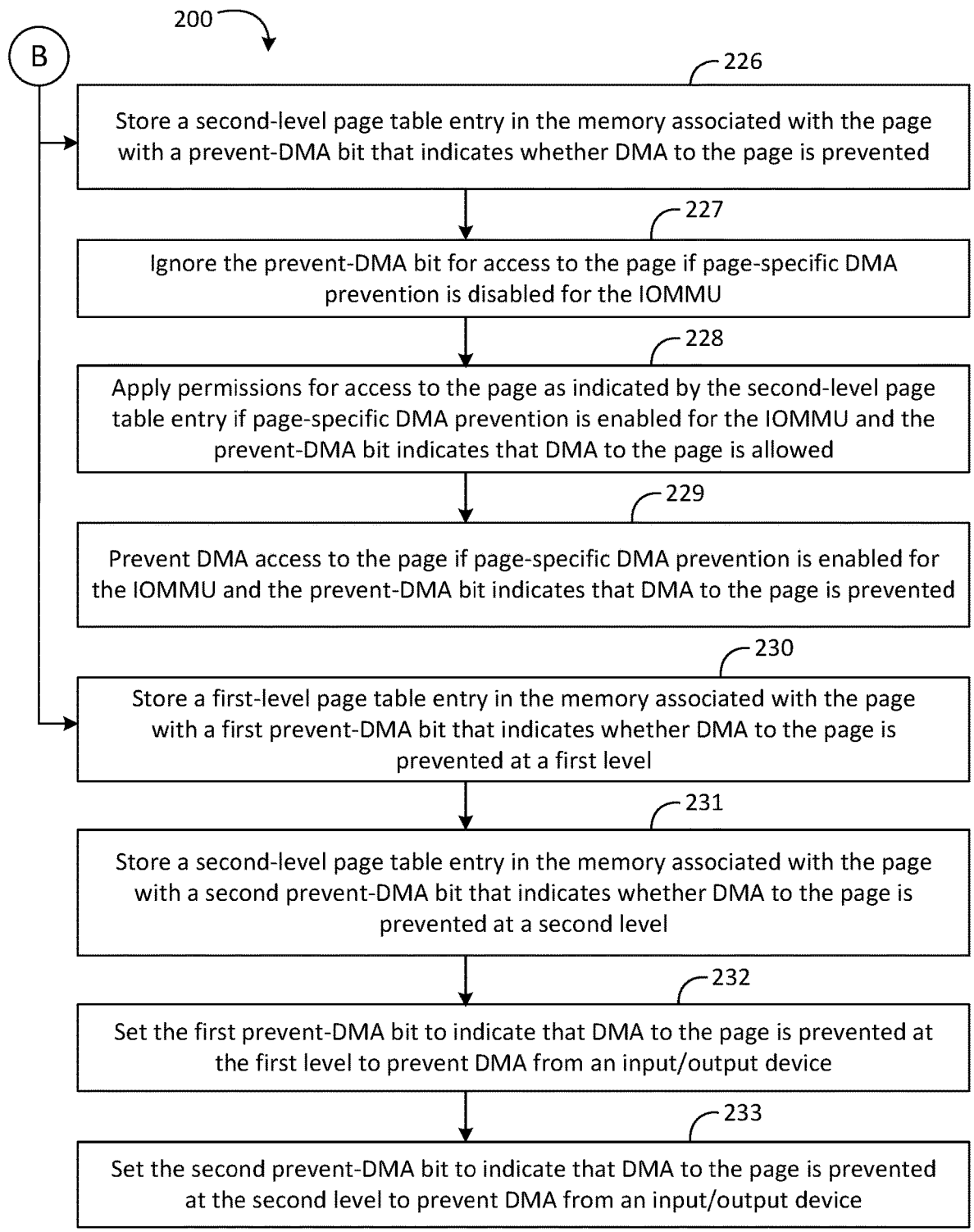

Embodiments discussed herein variously provide techniques and mechanisms for a memory management unit. The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including integrated circuitry which is operable to provide independently controlled direct memory access (DMA) and central processor unit (CPU) access to a shared memory region.

In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

Some embodiments provide technology for independently controlling central processor unit (CPU) accesses and direct memory accesses (DMAs) to a shared memory region. Some conventional memory management technology may involve substantial memory overhead, software complexity/burden, and/or performance overhead. For example, a secure address translation service (Secure-ATS) may build per-domain reference counters or reverse mappings. To inhibit DMA attacks in a non-Shared Virtual Memory (non-SVM) environment, software may build separate input/output (I/O) page-tables. To perform page-migration, software may utilize separate page-tables between CPU and I/O devices. Some embodiments may overcome one or more of the foregoing problems with technology to provide extensions to an input/output memory management unit (IOMMU) and/or virtualization technology for direct I/O (VT-d) and page-table extensions to prevent DMA at a page-granularity, and/or to provide support to control CPU and DMA read/ write permissions separately. Advantageously, some embodiments may make Secure-ATS architectures more viable for an operating system (OS) and/or a virtual machine monitor (VMM), protect critical data-structures against DMA attacks, and/or support transparent page-migration across CPU and I/O devices.

With reference to FIG. 1, an embodiment of an integrated circuit 100 may include circuitry 113 configured to share page tables associated with a page between a processor memory management unit (MMU) and an IOMMU, store a page table entry in the memory associated with the page, and separately control access to the page from a processor and from a DMA request based on one or more fields of the stored page table entry. For example, the circuitry 113 may be configured to prevent DMA to the page based on one or more fields of the stored page table entry, and/or to perform a copy-on-read operation for an input/out access to the page based on one or more fields of the stored page table entry.

In some embodiments, the circuitry 113 may be further configured to store a second-level page table entry in the memory associated with the page with a prevent-DMA bit that indicates whether DMA to the page is prevented, ignore the prevent-DMA bit for access to the page if page-specific DMA prevention is disabled for the IOMMU, apply permissions for access to the page as indicated by the second-level page table entry if page-specific DMA prevention is enabled for the IOMMU and the prevent-DMA bit indicates that DMA to the page is allowed, and prevent DMA access to the page if page-specific DMA prevention is enabled for the IOMMU and the prevent-DMA bit indicates that DMA to the page is prevented.

Additionally, or alternatively, the circuitry 113 may be configured to store a first-level page table entry in the memory associated with the page with a first prevent-DMA bit that indicates whether DMA to the page is prevented at a first level, store a second-level page table entry in the memory associated with the page with a second prevent-DMA bit that indicates whether DMA to the page is prevented at a second level, set the first prevent-DMA bit to indicate that DMA to the page is prevented at the first level to prevent DMA from an input/output device, and set the second prevent-DMA bit to indicate that DMA to the page is prevented at the second level to prevent DMA from an input/output device.

In some embodiments, the circuitry 113 may also be configured to store a first-level and/or second-level page table entry in the memory associated with the page with a read permission bit and a write permission bit for a processor request and a read-DMA permission bit and a write-DMA permission bit for an input/output request, and/or to store a first-level and/or second-level page table entry in the memory associated with the page with a prevent-processor bit to indicate whether processor access is prevented and a prevent-DMA bit to indicate whether DMA is prevented.

With reference to FIGS. 2A to 2B, an embodiment of a method 200 may include sharing page tables associated with a page between a processor MMU and an IOMMU at box 221, storing a page table entry in the memory associated with the page at box 222, and separately controlling access to the page from a processor and from a DMA request based on one or more fields of the stored page table entry at box 223. For example, the method 200 may include preventing DMA to the page based on one or more fields of the stored page table entry at box 224, and/or performing a copy-on-read operation for an input/output device access to the page based on one or more fields of the stored page table entry at box 225.

Some embodiments of the method 200 may further include storing a second-level page table entry in the memory associated with the page with a prevent-DMA bit that indicates whether DMA to the page is prevented at box 226, ignoring the prevent-DMA bit for access to the page if page-specific DMA prevention is disabled for the IOMMU at box 227, applying permissions for access to the page as indicated by the second-level page table entry if page-specific DMA prevention is enabled for the IOMMU and the prevent-DMA bit indicates that DMA to the page is allowed at box 228, and preventing DMA access to the page if page-specific DMA prevention is enabled for the IOMMU and the prevent-DMA bit indicates that DMA to the page is prevented at box 229.

Additionally, or alternatively, the method 200 may include storing a first-level page table entry in the memory associated with the page with a first prevent-DMA bit that indicates whether DMA to the page is prevented at a first level at box 230, storing a second-level page table entry in the memory associated with the page with a second prevent-DMA bit that indicates whether DMA to the page is prevented at a second level at box 231, setting the first prevent-DMA bit to indicate that DMA to the page is prevented at the first level to prevent DMA from an input/output device at box 232, and setting the second prevent-DMA bit to indicate that DMA to the page is prevented at the second level to prevent DMA from an input/output device at box 233.

Some embodiments of the method 200 may further include storing a first-level and/or second-level page table entry in the memory associated with the page with a read permission bit and a write permission bit for a processor request and a read-DMA permission bit and a write-DMA permission bit for an input/output request at box 234, and/or storing a first-level and/or second-level page table entry in the memory associated with the page with a prevent-processor bit to indicate whether processor access is prevented and a prevent-DMA bit to indicate whether DMA is prevented at box 235.

Some embodiments of the method 200 may further include returning an indication of success with no read or write permissions on a translation request for the page if, in the page table entry associated with the page, a prevent-DMA bit is set at box 236, and/or transparently migrating pages with separate processor and DMA read/write permissions in the page table entry at box 237.

Figure 3:
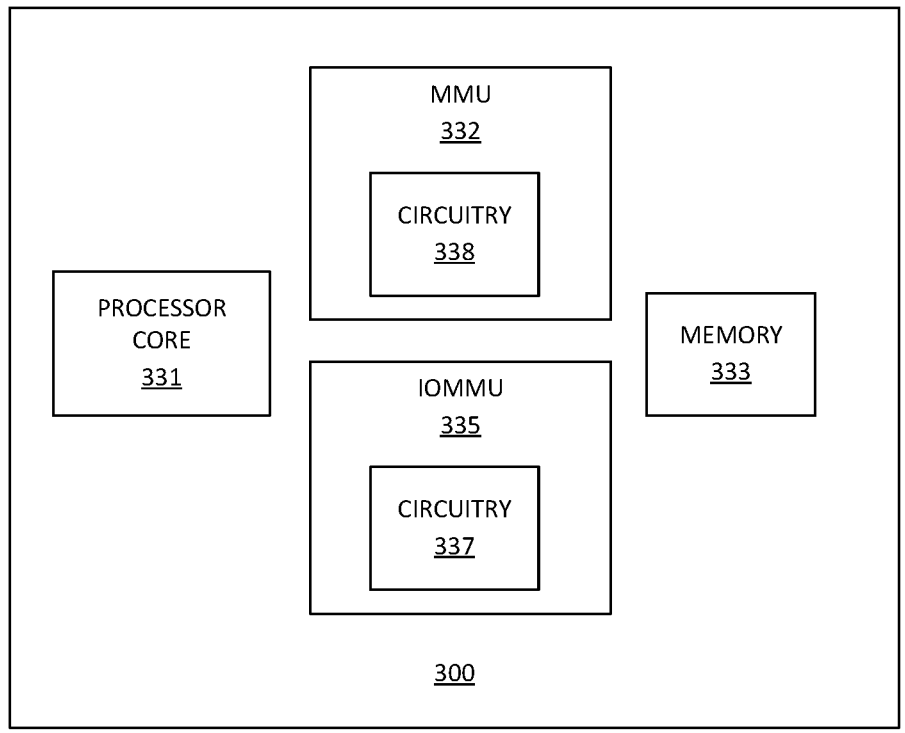
FIG. 3 is a block diagram of an example of an apparatus according to an embodiment.

With reference to FIG. 3, an embodiment of an apparatus 300 may include a processor core 331, processor MMU 332, a memory 333, and an IOMMU 335 communicatively coupled to the memory 333 and the processor core 331. The IOMMU 335 may include circuitry 337 and the processor MMU 332 may include circuitry 338 to share page tables associated with a page between the processor MMU 332 and the IOMMU 335, store a page table entry in the memory 333 associated with the page, and separately control access to the page from the processor core 331 and from a direct memory access (DMA) request based on one or more fields of the stored page table entry. For example, the circuitry 337 may be configured to prevent DMA to the page based on one or more fields of the stored page table entry, and/or to perform a copy-on-read operation for an input/output device access to the page based on one or more fields of the stored page table entry. For example, the circuitry 338 may be configured to prevent processor from accessing a page based on one or more fields of the stored page table entry.

In some embodiments, the circuitry 337 may be further configured to store a second-level page table entry in the memory 333 associated with the page with a prevent-DMA bit that indicates whether DMA to the page is prevented, ignore the prevent-DMA bit for access to the page if page-specific DMA prevention is disabled for the IOMMU, apply permissions for access to the page as indicated by the second-level page table entry if page-specific DMA prevention is enabled for the IOMMU and the prevent-DMA bit indicates that DMA to the page is allowed, and prevent DMA access to the page if page-specific DMA prevention is enabled for the IOMMU and the prevent-DMA bit indicates that DMA to the page is prevented.

Additionally, or alternatively, the circuitry 337 may be configured to store a first-level page table entry in the memory 333 associated with the page with a first prevent-DMA bit that indicates whether DMA to the page is prevented at a first level, store a second-level page table entry in the memory associated with the page with a second prevent-DMA bit that indicates whether DMA to the page is prevented at a second level, set the first prevent-DMA bit to indicate that DMA to the page is prevented at the first level to prevent DMA from an input/output device, and set the second prevent-DMA bit to indicate that DMA to the page is prevented at the second level to prevent DMA from an input/output device.

In some embodiments, the circuitry 337 and 338 may also be configured to store a first-level and/or second-level page table entry in the memory 333 associated with the page with a read permission bit and a write permission bit for a processor request and a read-DMA permission bit and a write-DMA permission bit for an input/output request, and/or to store a first-level and/or second-level page table entry in the memory 333 associated with the page with a prevent-processor bit to indicate whether processor access is prevented and a prevent-DMA bit to indicate whether DMA is prevented.

Copy-On-Read Examples

Some software systems (e.g., most operating systems and hypervisors, etc.) perform page-combining (e.g., sometimes referred to as de-duplication) to support memory overcommit. The software compares the contents of one or more pages belonging to different domains (e.g., processes, VMs, containers, etc.) and combines the compared pages into a single page if the contents are identical. The software may also enable copy-on-write (e.g., where the page table entry doesn't have write permissions) on these combined pages and create a new page copy on-demand (e.g., sometimes referred to as a page-split) by catching/handling a page-fault exception if any of the domains perform a write to the shared page. The software also maintains counters that keeps track of number of shares to determine if the page is currently shared or private (e.g., non-shared).

In an example scenario, a page at Host Physical Address (HPA) HPA_X is mapped into virtual machine (VM) VM1 at Guest Physical Address (GPA) GPA_A, a page at HPA_Y is mapped into VM2 at GPA_M, and a page at HPA_Z mapped into VM2 at GPA_N. In this scenario, the VMM now decides to combine these pages into a single page, resulting into creation of GPA_A to HPA_X mapping in VM1's extended page-tables (EPT), and GPA_M to HPA_X and GPA_N to HPA_X mapping in VM2's EPT, eventually freeing up pages at HPA_Y and HPA_Z. The VMM also marks the page as shared and increments the share count to track that there are currently three shares for the page at address HPA_X. Now if VM2 writes to this page (through GPA_N), the VMM creates another copy for VM2 and replaces GPA_N to point to HPA_W instead of HPA_X. Because the page was a shared page, as part of this replacement the VMM also reduces the share count for HPA_X, resulting in the count now becoming two. Because an EPT table exist per VM, the VMM doesn't have to maintain per domain/VM counters for shares, but rather may maintain a global counter for each page of physical memory, decrement the share count every time the page is removed from EPT (if shared), and convert a shared page to a private page once the share count becomes one.

For example, Table 1 shows how the share count may change over an example timeline.

TABLE 1

| Timeline | VM GPA Mappings | HPA | HPA/Page Share Count |
|---|---|---|---|
| T0 | VM1_GPA_A | HPA_Y | Count = 1 |
| | VM2_GPA_M | HPA_X | Count = 1 |
| | VM2_GPA_N | HPA_Z | Count = 1 |
| | — | HPA_W | Count = 0 |
| T1 | — | HPA_Y | Count = 0 |
| | VM1_GPA_A | HPA_X | Count = 2 |
| | VM2_GPA_M | | |
| | VM2_GPA_N | HPA_Z | Count = 1 |
| | — | HPA_W | Count = 0 |
| T2 | — | HPA_Y | Count = 0 |
| | VM1_GPA_A | HPA_X | Count = 3 |
| | VM2_GPA_M | | |
| | VM2_GPA_N | | |
| | — | HPA_Z | Count = 0 |
| | — | HPA_W | Count = 0 |
| T3 | — | HPA_Y | Count = 0 |
| | VM1_GPA_A | HPA_X | Count = 2 |
| | VM2_GPA_M | | |
| | — | HPA_Z | Count = 0 |
| | VM2_GPA_N | HPA_W | Count = 1 |

An example Secure-ATS architecture may utilize a host-permission table (HPT) that stores permissions for each physical page to enable secure address translation services and the HPT is indexed via a host physical address. Similar to the case without HPT above, when the VMM performs page-combining, the VMM populates appropriate page-permissions in the HPT. Because multiple GPAs belonging to the same or different VMs may map to same HPA, just maintain a total/global share count may not be sufficient for correctly populating the HPT. In the foregoing scenario, for example, when the mapping for GPA_N is updated from HPA_X to HPA_W, the VMM cannot remove the mapping for HPA_X in VM2's HPT because GPA_M is still mapped to HPA_X. In the case where VM2 writes to GPA_M next (e.g., resulting in a page-split and the VMM creating another copy pointing GPA_M to HPA_Q), however, the VMM must update the HPT to revoke the VM2 access to HPA_X because no more GPAs from VM2 are mapped to this page. The global counter would still be 0x1 because VM1 still has HPA_X mapped. However, the mapping for HPA_X must be removed from the HPT for VM2 to reflect the revocation because no GPAs from VM2 are mapped. Such a need to populate correct permissions in HPT now forces the VMM to maintain per-domain counters or reverse mappings (e.g., HPA to GPA mappings) to figure-out when to keep the HPT permissions and when to revoke them. Moreover, because HPT is indexed via HPA and a VM can potentially get assigned to any physical page, the VMM may have to comprehend the size of these counters to represent complete physical memory and not just the memory assigned to the VM. Such a requirement puts a huge burden on software to maintain these per-domain counters or reverse mappings, and also results in significant memory cost/overheads because these counters are at HPA granularity and not at a GPA granularity (e.g., if a VM is of size 100 MB and physical memory is of size 1 TB, the software has to create counters for the whole 1 TB worth of address range and must do the same for each secure-ATS enabled domain). As cloud environments move towards higher density VM configurations and machine containers, potentially thousands of different counter sets each spanning the whole HPA range may be needed. The counter sets would occupy memory that may otherwise be used for other platform needs, and such overhead makes Secure-ATS architecture less practical.

For example, Table 2 shows how different counts may change over an example timeline.

TABLE 2

| Timeline | VM GPA Mappings | HPA | HPA/Page Share Count |
|---|---|---|---|
| T2 | — | HPA_Y | Global_Count = 0<br>VM1_Count = 0<br>VM2_Count = 0 |
|  | VM1_GPA_A,<br>VM2_GPA_M,<br>VM2_GPA_N | HPA_X | Global_Count = 3<br>VM1_Count = 1<br>VM2_Count = 2 |
|  | — | HPA_Z | Global_Count = 0<br>VM1_Count = 0<br>VM2_Count = 0 |
|  | — | HPA_W | Global_Count = 0<br>VM1_Count = 0<br>VM2_Count = 0 |
| T3 | — | HPA_Y | Global_Count = 0<br>VM1_Count = 0<br>VM2_Count = 0 |
|  | VM1_GPA_A,<br>VM2_GPA_M | HPA_X | Global_Count = 2<br>VM1_Count = 1<br>VM2_Count = 1 |
|  | — | HPA_Z | Global_Count = 0<br>VM1_Count = 0<br>VM2_Count = 0 |
|  | VM2_GPA_N | HPA_W | Global_Count = 1<br>VM1_Count = 0<br>VM2_Count = 1 |
| T4 | — | HPA_Y | Global_Count = 0<br>VM1_Count = 0<br>VM2_Count = 0 |
|  | VM1_GPA_A | HPA_X | Global_Count = 1<br>VM1_Count = 1<br>VM2_Count = 0 |
|  | — | HPA_Z | Global_Count = 0<br>VM1_Count = 0<br>VM2_Count = 0 |
|  | VM2_GPA_N | HPA_W | Global_Count = 1<br>VM1_Count = 0<br>VM2_Count = 1 |
|  | VM2_GPA_M | HPA_Q | Global_Count = 1<br>VM1_Count = 0<br>VM2_Count = 1 |

Some embodiments provide technology for a copy-on-read operation for I/O accesses to deduplicated and/or shared pages to remove the burden of maintaining per-domain reference counters or reverse mappings. Some embodiments may provide the copy-on-read operation with a capability to block DMA access (e.g., prevent DMA access) to specific pages in second-level translation tables, which may be particularly useful for Secure-ATS applications and/or dynamic memory relocation (DMR) applications. For example, some embodiments may include a per-page "Block DMA" (BD) bit in EPT and/or second-level page-tables to block DMA access to the deduplicated/shared pages. Some embodiments may further include a Page-Specific Block DMA Enable (PBDE) bit in the IOMMU/VT-d that controls the functionality of the BD bit in second-level (SL) translations. In some embodiments, the BD bit is bit 62 in all second level entries (e.g., for leaf entries the BD bit replaces a deprecated transient mapping (TM) bit). For example, the capability to block DMA access to specific pages in second-level translation tables may be applied to both legacy and scalable mode.

Figure 4:
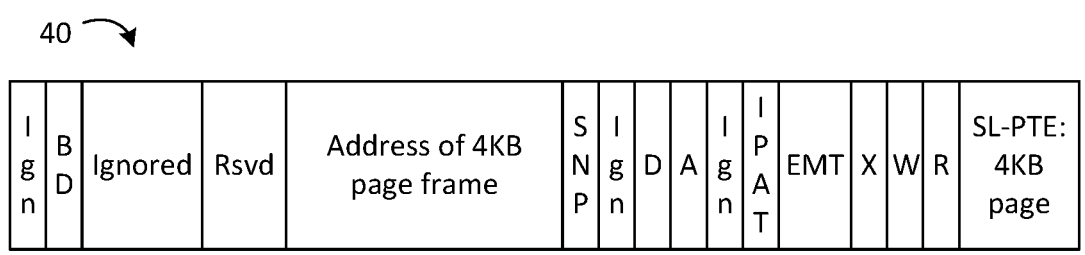

With reference to FIG. 4, an embodiment of a page table entry 40 includes a second-level page table entry (SL-PTE) for a 4 KB page. The SL-PTE 40 includes a BD bit together with other bits/fields such as, for example, Ignored (Ign) bits/fields, Reserved (Rsvd) bits/fields, an address field (e.g., for the address of the 4 KB page frame), a snoop (SNP) bit, a dirty (D) bit, an accessed (A) bit, an ignore page attribute table (IPAT) bit, an extended memory type (EMT) field, an execution (X) permission bit, a write (W) permission bit, and a read (R) permission bit.

In some embodiments, if the PBDE bit is 0, the BD bit is ignored and has no effect. If the PBDE bit is 1, then DMA permissions associated with the SL entry depend on the value of the BD bit. If the BD bit is 0, then DMA permissions for the entry are the R/W/X permission bits specified in the entry. If the BD bit is 1, then DMA permissions for the entry are treated as R=W=X=0 (e.g., effectively blocking DMA access). Some embodiments may further include a Page-Specific Block DMA Support (PBDS) bit in the IOMMU/VT-d to enumerate the support for the block DMA technology.

When performing a page-merge, in accordance with some embodiments, the software may configure a page for copy-on-write for CPU accesses and copy-on-read/write for I/O accesses. For example, the software may achieve this by setting the BD bit along with the R bit (and keeping the W bit cleared). Such a page-table configuration: (i) will result into an EPT violation on CPU accesses allowing the software to create a copy (e.g., a copy-on-write); and (ii) will result into the IOMMU/VT-d returning "Success with R=W=U=S=O" on translation requests requiring the I/O device to issue a page-request to create a copy of a page even for reads (e.g., a copy-on-read/write). CPU accesses do not require the copy-on-read capability because CPU accesses would not be subject to the counting problem discussed above in connection with Secure-ATS technology.

Because most targets for same-page merge operation are code-pages or data-pages that are not target for I/O, copy-on-read designations should not result in much performance overhead or an expansion of the memory footprint. At the same time, however, embodiments of copy-on-read technology advantageously will significantly reduce software complexity and overheads associated with storing/maintaining per-domain counters.

Protection Against DMA Attack Examples

There are some real-world scenarios where the CPU should be able to access the memory but an I/O device should be prevented from accessing the memory. For example, such scenarios include protecting kernel structures against DMA attacks (e.g., sometimes also referred to as Kernel-DMA protection) or protecting metadata structures for Memory Tagging Technology (MTT).

With conventional technology, the OS/VMM software creates separate DMA remapping tables (e.g., tables representing IOVA space) to protect against DMA attacks. However, such techniques suffer from the software complexity and memory overheads associated with maintaining two set of page-tables (e.g., both CPU and VT-d page-tables). Such techniques may also not be effective for Shared Virtual Memory (SVM)-enabled scenarios which require sharing of page-tables between the CPU and the VT-d.

Some embodiments may utilize the BD bit in EPT/second-level page-tables (e.g., similar to as described above) to prevent DMA attacks while sharing the same set of page-tables between the CPU and VT-d. In some embodiments, the software will by default set the BD bit for all memory pages, and may then open-up DMA permissions as the pages become I/O targets.

Additionally, or alternatively, some embodiments may include a BD bit to process for first-level page tables (e.g., in addition to the BD bit in the second-level page tables). Advantageously, the software can use the BD bit in the first-level page tables to prevent DMA attacks to pages belonging to first-level domain or metadata structures for MTT.

With reference to FIG. 5, an embodiment of a page table entry 50 includes a first-level page table entry (PTE) for a 4 KB page. The PTE 50 includes a BD bit together with other bits/fields such as, for example, Ignored (Ign) bits/fields, Reserved (Rsvd) bits/fields, an address field (e.g., for the address of the 4 KB page frame), a protection key field, an execute disable (XD) bit, a global (G) bit, a page attribute (PAT) bit, a dirty (D) bit, an accessed (A) bit, a page-level cache disable (PCD) bit, a page-level write through (PWT) bit, a user/supervisor (U/S) bit, and a read/write (R/W) bit.

Separate DMA Read and Write Control Examples

Unified Shared Memory (USM) technology provides a unified/shared view of memory between the CPU and graphics processing units (GPUs). USM technology may extend SVM to better support heterogenous memory accelerators with device memory. However, for achieving transparent migration of data closer to compute, USM relies on device-specific mechanisms including the use of device page-tables (e.g. a graphics translation table (GTT)) and driver-based page-fault handling. Accordingly, USM technology may involve increased overhead for managing two or more sets of page-tables and also creates some challenges and/or robustness concerns because a device-driver may participate in memory management (e.g., a poorly implemented device-driver can impact the stability of overall system).

Some embodiments may include two permission bits "DMA Read" (DR) and "DMA Write" (DW) in the EPT and/or second-level page table entry (e.g., in addition to the R and W bits). The R and W bits allow the software to control CPU read and write accesses respectively, while the DR and DW bits allow the software to control I/O read and write accesses respectively.

With reference to FIG. 6, an embodiment of a page table entry 60 includes a second-level page table entry (SL-PTE) for a 4 KB page. The SL-PTE 60 includes a DR bit and a DW bit together with other bits/fields such as, for example, Ignored (Ign) bits/fields, Reserved (Rsvd) bits/fields, an address field (e.g., for the address of the 4 KB page frame), a snoop (SNP) bit, a dirty (D) bit, an accessed (A) bit, an ignore page attribute table (IPAT) bit, an extended memory type (EMT) field, an execution (X) permission bit, a write (W) permission bit, and a read (R) permission bit.

Separate CPU and DMA Control Examples

Some embodiments may include two bits "Block DMA" (BD) and "Block CPU" (BC) in a process/first-level page table entry. The BD/BC bits in combinations with the RAY bit(s) allow the software to control CPU and I/O accesses independently.

With reference to FIG. 7, an embodiment of a page table entry 70 includes a first-level page table entry (PTE) for a 4 KB page. The PTE 70 includes a BD bit and a BC bit together with other bits/fields such as, for example, Ignored (Ign) bits/fields, Reserved (Rsvd) bits/fields, an address field (e.g., for the address of the 4 KB page frame), a protection key field, an execute disable (XD) bit, a global (G) bit, a page attribute (PAT) bit, a dirty (D) bit, an accessed (A) bit, a page-level cache disable (PCD) bit, a page-level write through (PWT) bit, a user/supervisor (U/S) bit, and a read/write (R/W) bit.

Transparent Page Migration Examples

In some embodiments, the use of separate CPU and DMA read/write permissions in page-tables support transparent page-migration for USM usages. For example, the software may utilize these permission settings to keep the data/page only accessible to either CPU or an accelerator at one point of time and then transparently perform page-migration to bring the data closer to compute by handling CPU or I/O page-faults. Advantageously, some embodiments allow the software to share the same page-tables between CPU and I/O devices and enable the OS to support page-migration across heterogenous memory without requiring device-driver involvement.

For example, buffers may be initially allocated in system memory and mapped into page-tables with only CPU R/W access (and no DMA R/W access). Software running on the CPU then prepares the buffers and issues a work submission to an accelerator. As the accelerator tries to touch/access the buffers, the accelerator will run into an I/O page-fault. The OS software can now use the I/O page-fault as a hint to transparently migrate a page to the accelerator memory to bring it closer to compute and map the migrated page with only DMA R/W access (and no CPU R/W access). After the I/O page-fault is resolved, the accelerator can keep working on the buffers and finally signal the work completion to the CPU. When the software running on the CPU tries to access the results, the access causes a CPU page-fault. The CPU page-fault may then be used as a hint by the OS software to migrate the page back to system memory.

VT-d Examples

In connection with access rights for second-level translations, devices can issue requests for reads, writes, or atomics. The following describes how second-level translation determines access rights for such requests in accordance with some embodiments:

Data reads: Read requests with value of 0 in an Execute-Requested (ER) field. Reads are allowed from any input address with a valid translation for which the Read (R) field is 1 and the BD field is 0 in every paging-structure entry controlling the translation. If the PBDE field in the Root Table Address Register is clear, the BD field is reserved and must be 0.

Instruction fetches: Read requests with value of 1 in the ER field. If a Second-Level Execute-Enable (SLEE) field used to translate the request is 0, then instruction fetches are allowed from any input address with a valid translation for which the Read (R) field is 1 and the BD field is 0 in every second-level paging-entry controlling the translation. If the SLEE field used to translate the request is 1, then instruction fetches are allowed from any input address with a valid translation for which the Read (R) and Execute (X) fields are both 1 and the Block DMA (BD) field is 0 in every second-level paging-entry controlling the translation.

Write request: Writes are allowed to any input address with a valid translation for which the Write (W) field is 1 and the BD field is 0 in every paging-structure entry controlling the translation.

Atomics request: Atomics requests are allowed from any input address with a valid translation for which the Read (R) and Write (W) fields are both 1 and the BD) field is 0 in every paging-structure entry controlling the translation.

In connection with nested translations, access rights for second-level translations function as follows for access to paging structures (e.g., first-level paging structure pointer, PMLSE, PML4E, PDPE, PDE, PTE, etc.): When Second-Level Accessed/Dirty flags are not enabled in PASID-table entry (SLADE=0) reads of paging structures are allowed from any input address with a valid translation for which the Read (R) field is 1 and the BD field is 0 in every second-level paging-entry controlling the translation. When SLADE=0, for accessed (A), Extended-Accessed (EA), Dirty (D) flag update of first-level paging-structure entries, atomic A/EA/D flag update of first-level paging-entries are allowed from any input address with a valid translation for which the Read (R) and Write (W) fields are 1 and the BD field is 0 in every second-level paging-entry controlling the translation to the respective first-level paging-entry. When SLADE=1 (e.g., Second-Level Accessed/Dirty flags are enabled in PASID-table entry), all non-leaf first-level paging structure access are treated as if they will need to update A/EA flags, and access to first-level paging structures are allowed from any input address with valid translation for which the Read (R) and Write (W) fields are 1 and the BD field is 0 in every second-level paging-entry controlling the translation to the respective first-level paging-entry. When SLADE=1, all leaf first-level paging structure access are treated as if they will need to update A/EA/D flags, and access to first-level paging structures are allowed from any input address with valid translation for which the Read (R) and Write (W) fields are 1 and the BD field is 0 in every second-level paging-entry controlling the translation to the respective first-level paging-entry.

In connection with nested translations, access rights for second-level translations function as follows for access to the final page:

Data reads: Read requests with value of 0 in the ER field. Reads are allowed from any input address with a valid translation for which the Read (R) field is 1 and the BD field is 0 in every paging-structure entry controlling the translation Instruction fetches: Read requests with value of 1 in the ER field. If the SLEE field used to translate the request is 0, then instruction fetches are allowed from any input address with a valid translation for which the Read (R) field is 1 and the BD field is 0 in every second-level paging-entry controlling the translation. If the SLEE field used to translate the request is 1, the instruction fetches are allowed from any input address with a valid translation for which the Read (R) and Execute (X) fields are both 1 and the BD field is 0 in every second-level paging-entry controlling the translation.

Write request: Writes are allowed to any input address with a valid translation for which the Write (W) field is 1 and the BD field is 0 in every paging-structure entry controlling the translation.

Atomics request: Atomics requests are allowed from any input address with a valid translation for which the Read (R) and Write (W) fields are both 1 and the BD field is 0 in every paging-structure entry controlling the translation.

Table 3 shows examples of translation fault conditions and DMA remapping hardware behavior:

TABLE 3

| Condition | Condition Code | Fault Reason (if reported) | Translated Request |
|---|---|---|---|
| Legacy-Mode Second-Level Table Faults | | | |
| When legacy mode (RTADDR_REG.TTM=00b) is enabled, hardware encountered a second-level paging entry (SL-PML5E, SL-PML4E, SL-PDPE, SL-PDE, or SL-PTE) with the Page-Specific Block DMA (BD) field is set when Page-Specific Block DMA Support field of the Extended Capability Register is 0. | LSL.3 | 0Fh | UR |
| Scalable-Mode Second-Level Table Faults | | | |
| When scalable mode (RTADDR_REG.TTM=01b) is enabled, hardware encountered a second-level paging entry (SL-PML5E, SL-PML4E, SL-PDPE, SL-PDE, or SL-PTE) with the Page-Specific Block DMA (BD) field is set when Page-Specific Block DMA Support field of the Extended Capability Register is 0. | SSL.7 | 7Fh | UR |

With reference to FIG. 8, embodiments of various second-level page table entries 80 each include a BD to prevent DMA access to the respective pages. In this example, bit 62 of each of the various entries corresponds to the BD bit/field, where a value of BD=0 indicates that access rights to the region controlled by this entry are specified in the R, W and X bits of this entry (e.g., where the region corresponds to a 1 GB region, a 1 GB page, a 2 MB region, a 2 MB page, etc., depending on the table), and where a value of BD=1 indicates that Access to the region controlled by this entry is not allowed, regardless of the setting of the R, W and X bits of this entry.

In some embodiments, the BD field is reserved and must be 0 if the Page-Specific Block DMA Support field of an Extended Capability Register is 0. For example, the Extended Capability Register may include a read-only PBDS bit/field (e.g., bit 58) where a value of PBDS=0 indicates that the hardware does not support Page-Specific Block DMA, and where a value of PBDS=1 indicates that the hardware supports Page-Specific Block DMA. Support may be enabled for all devices by setting the Page-Specific Block DMA Enable field in a Root Table Address Register. For example, the Root Table Address Register may include a read/write PBDE bit/field (e.g., bit 8), where a value of PBDE=0 indicates that the BD bit in second-level paging structures is ignored and has no effect, an where a value of PBDE=1 indicates that the BD in second-level paging structures can be used to prevent DMA accesses.

Those skilled in the art will appreciate that a wide variety of devices may benefit from the foregoing embodiments. The following exemplary core architectures, processors, and computer architectures are non-limiting examples of devices that may beneficially incorporate embodiments of the technology described herein.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 9A is a block diagram illustrating both an exemplary in-order pipeline and an exemplary register renaming, out-of-order issue/execution pipeline according to embodiments of the invention. FIG. 9B is a block diagram illustrating both an exemplary embodiment of an in-order architecture core and an exemplary register renaming, out-of-order issue/execution architecture core to be included in a processor according to embodiments of the invention. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster— and in the case of a separate memory access pipeline, certain embodiments are implemented in which only the execution cluster of this pipeline has the memory access unit(s) 964. It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 10B is an expanded view of part of the processor core in FIG. 10A according to embodiments of the invention. FIG. 10B includes an L1 data cache 1006A part of the L1 cache 1006, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Figure 11:
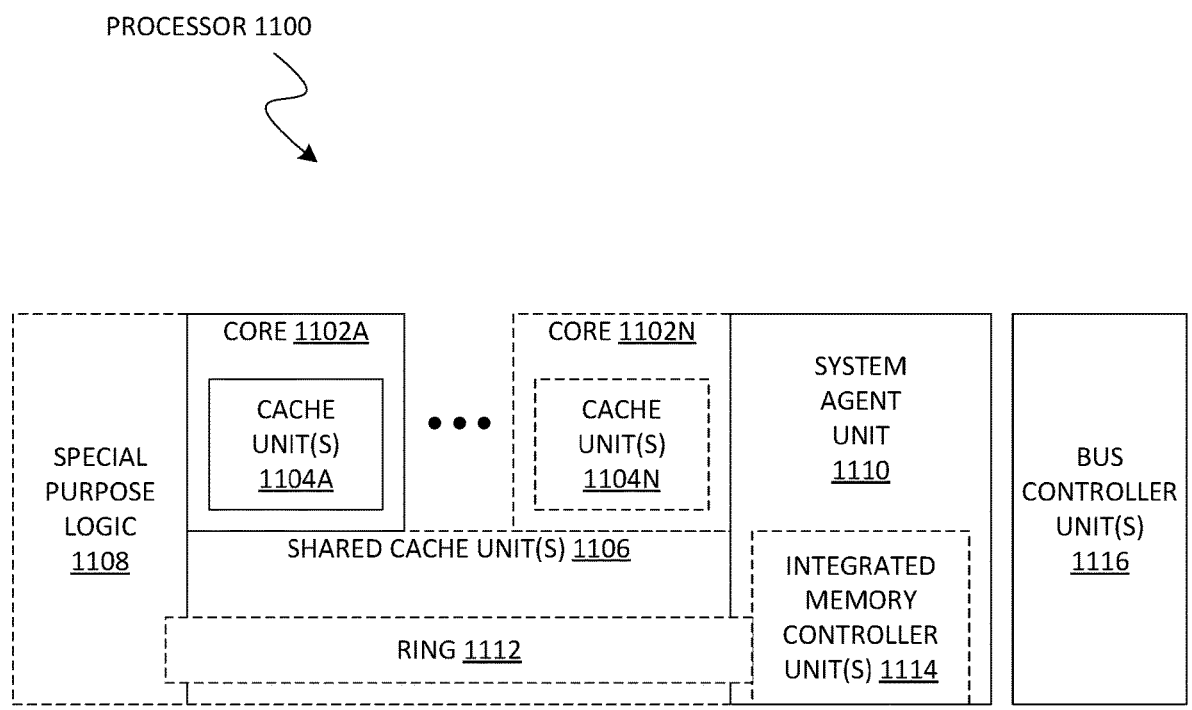
FIG. 11 is a block diagram of a processor that may have more than one core, may have an integrated memory controller, and may have integrated graphics according to embodiments of the invention.

FIG. 11 is a block diagram of a processor 1100 that may have more than one core, may have an integrated memory controller, and may have integrated graphics according to embodiments of the invention. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of respective caches 1104A-N within the cores 1102A-N, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multi-threading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 12-15 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
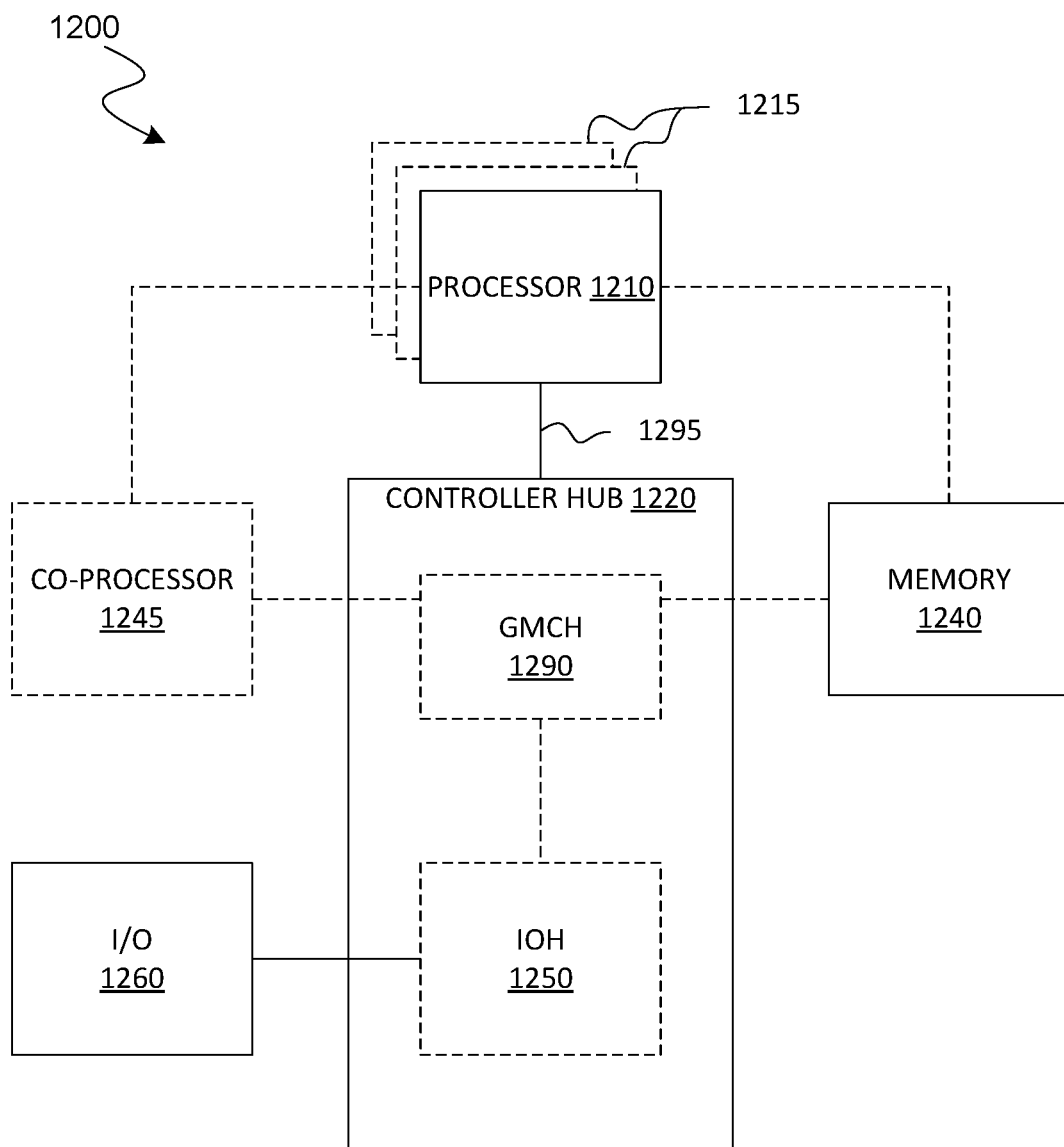
FIGS. 12-15 are block diagrams of exemplary computer architectures.

Referring now to FIG. 12, shown is a block diagram of a system 1200 in accordance with one embodiment of the present invention. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
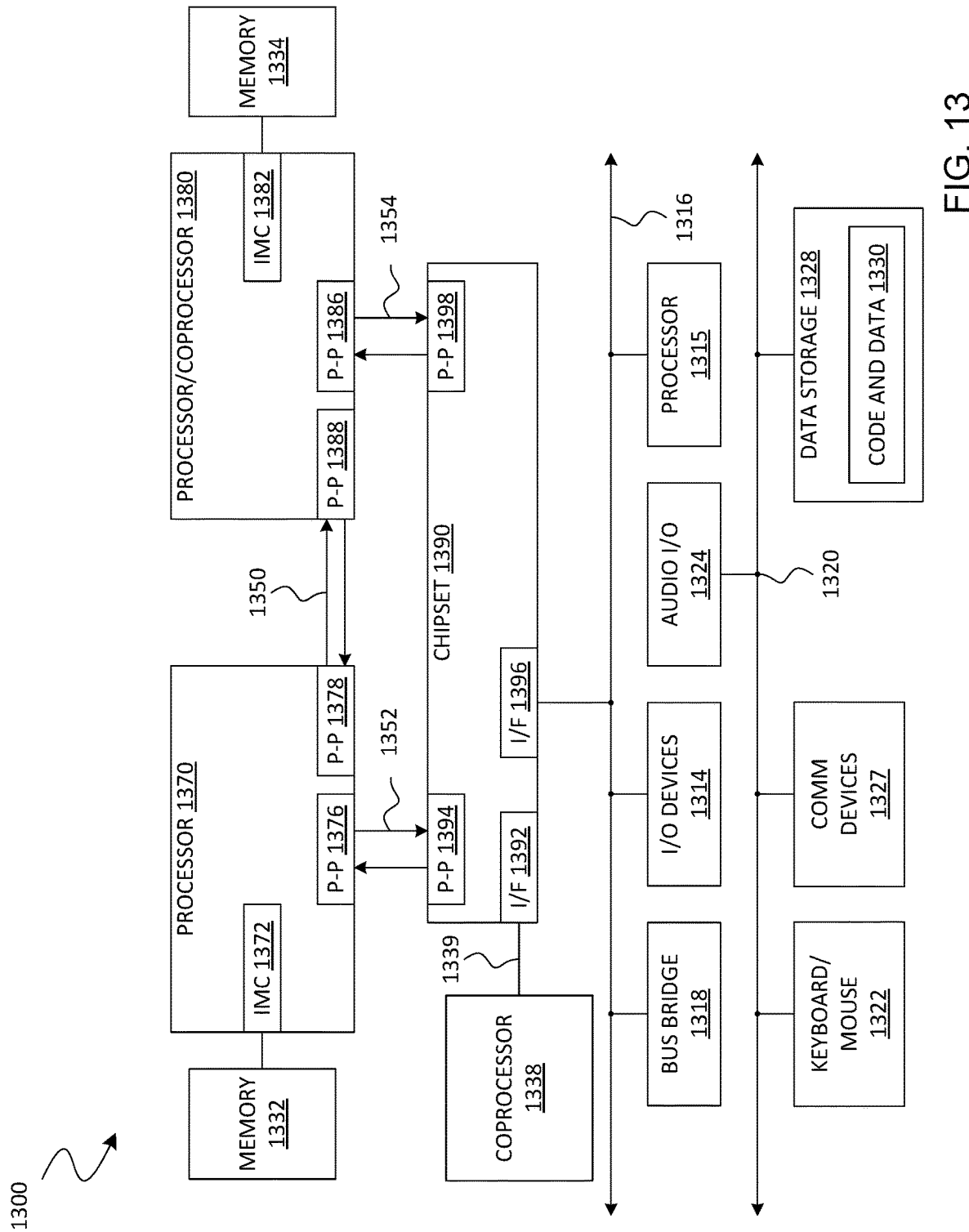

Referring now to FIG. 13, shown is a block diagram of a first more specific exemplary system 1300 in accordance with an embodiment of the present invention. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339 and an interface 1392. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Figure 14:
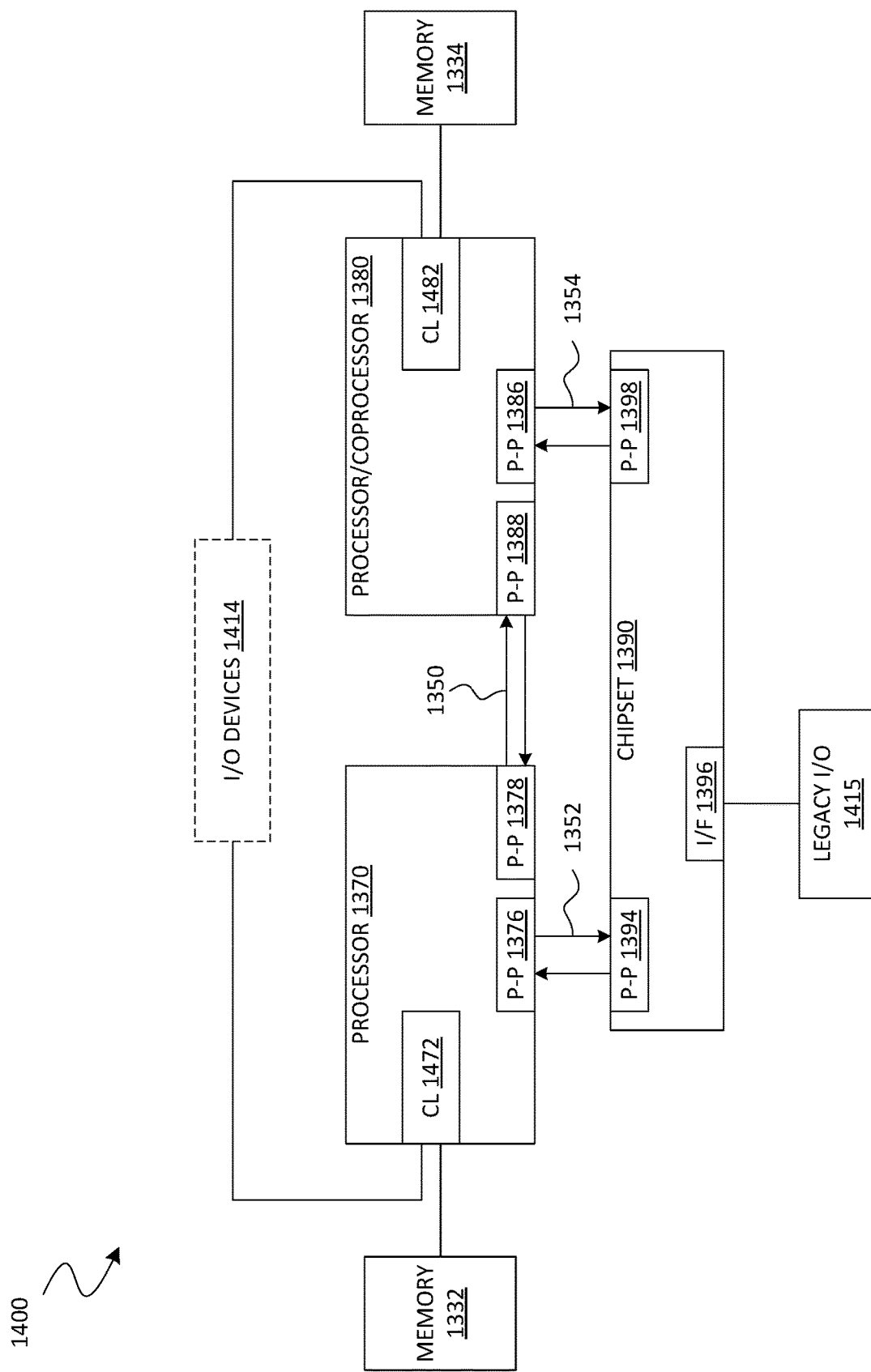

Referring now to FIG. 14, shown is a block diagram of a second more specific exemplary system 1400 in accordance with an embodiment of the present invention Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1472 and 1482, respectively. Thus, the CL 1472, 1482 include integrated memory controller units and include I/O control logic. FIG. 14 illustrates that not only are the memories 1332, 1334 coupled to the CL 1472, 1482, but also that I/O devices 1414 are also coupled to the control logic 1472, 1482. Legacy I/O devices 1415 are coupled to the chipset 1390.

Figure 15:
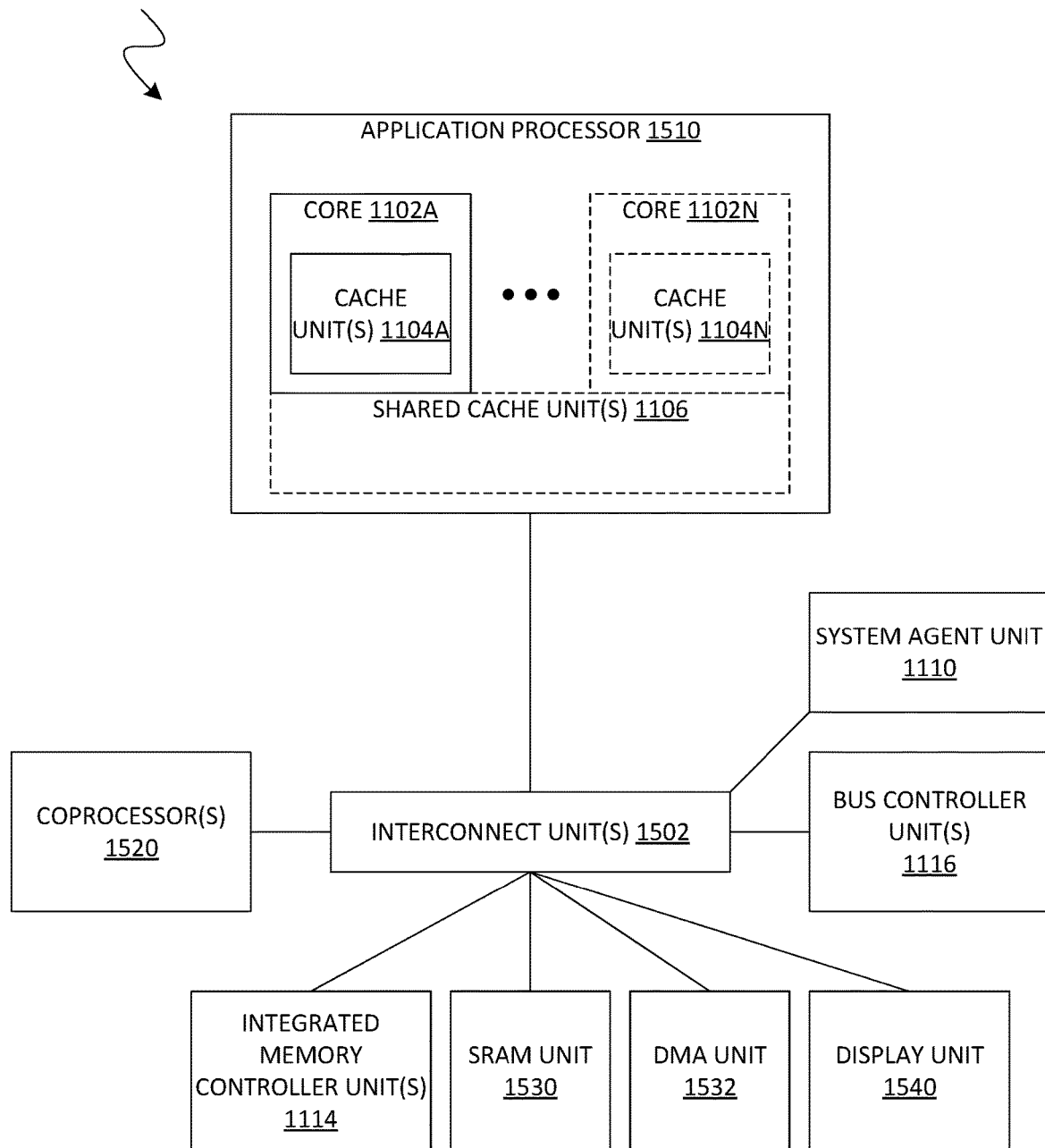

Referring now to FIG. 15, shown is a block diagram of a SoC 1500 in accordance with an embodiment of the present invention. Similar elements in FIG. 11 bear like reference numerals. Also, dashed lined boxes are optional features on more advanced SoCs. In FIG. 15, an interconnect unit(s) 1502 is coupled to: an application processor 1510 which includes a set of one or more cores 1102A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 16:
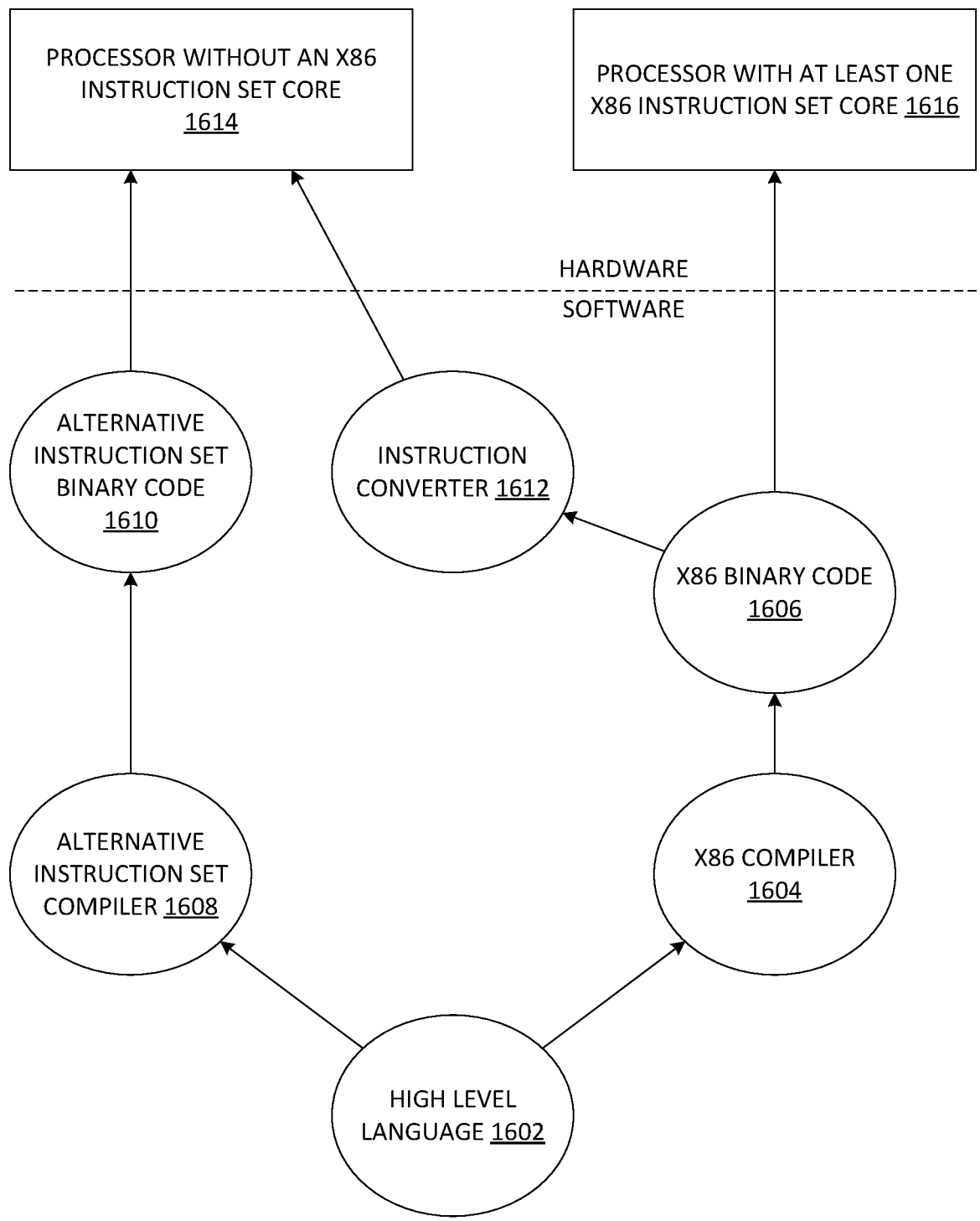
FIG. 16 is a block diagram contrasting the use of a software instruction converter to convert binary instructions in a source instruction set to binary instructions in a target instruction set according to embodiments of the invention.

FIG. 16 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, CA and/or that execute the ARM instruction set of ARM Holdings of Sunnyvale, CA). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

ADDITIONAL NOTES AND EXAMPLES

Example 1 includes a apparatus, comprising a memory, a processor core, a processor memory management unit (MMU) communicatively coupled to the memory and the processor core, and an input/output memory management unit (IOMMU) communicatively coupled to the memory and the processor core, the processor MMU and the IOMMU including circuitry to share page tables associated with a page between the processor MMU and the IOMMU, store a page table entry in the memory associated with the page, and separately control access to the page from the processor core and from a direct memory access (DMA) request based on one or more fields of the stored page table entry.

Example 2 includes the apparatus of Example 1, wherein the circuitry is further to prevent DMA to the page based on one or more fields of the stored page table entry.

Example 3 includes the apparatus of any of Examples 1 to 2, wherein the circuitry is further to perform a copy-on-read operation for an input/output device access to the page based on one or more fields of the stored page table entry.

Example 4 includes the apparatus of Example 3, wherein the circuitry is further to store a second-level page table entry in the memory associated with the page with a prevent-DMA bit that indicates whether DMA to the page is prevented, ignore the prevent-DMA bit for access to the page if page-specific DMA prevention is disabled for the IOMMU, apply permissions for access to the page as indicated by the second-level page table entry if page-specific DMA prevention is enabled for the IOMMU and the prevent-DMA bit indicates that DMA to the page is allowed, and prevent DMA access to the page if page-specific DMA prevention is enabled for the IOMMU and the prevent-DMA bit indicates that DMA to the page is prevented.

Example 5. The apparatus of any of Examples 3 to 4, wherein the circuitry is further to store a first-level page table entry in the memory associated with the page with a first prevent-DMA bit that indicates whether DMA to the page is prevented at a first level, store a second-level page table entry in the memory associated with the page with a second prevent-DMA bit that indicates whether DMA to the page is prevented at a second level, set the first prevent-DMA bit to indicate that DMA to the page is prevented at the first level to prevent DMA from an input/output device, and set the second prevent-DMA bit to indicate that DMA to the page is prevented at the second level to prevent DMA from an input/output device.

Example 6 includes the apparatus of any of Examples 1 to 5, wherein the circuitry is further to store one or more of a first-level page table entry and a second-level page table entry in the memory associated with the page with a read permission bit and a write permission bit for a processor request and a read-DMA permission bit and a write-DMA permission bit for an input/output request.

Example 7 includes the apparatus of any of Examples 1 to 6, wherein the circuitry is further to store one or more of a first-level page table entry and a second-level page table entry in the memory associated with the page with a prevent-processor bit to indicate whether processor access is prevented and a prevent-DMA bit to indicate whether DMA is prevented.

Example 8 includes an integrated circuit comprising circuitry to share page tables associated with a page between a processor memory management unit (MMU) and an input/output memory management unit (IOMMU), store a page table entry in the memory associated with the page, and separately control access to the page from a processor and from a direct memory access (DMA) request based on one or more fields of the stored page table entry.

Example 9 includes the integrated circuit of Example 8, wherein the circuitry is further to prevent DMA to the page based on one or more fields of the stored page table entry.

Example 10 includes the integrated circuit of any of Examples 8 to 9, wherein the circuitry is further to perform a copy-on-read operation for an input/out access to the page based on one or more fields of the stored page table entry.

Example 11 includes the integrated circuit of Example 10, wherein the circuitry is further to store a second-level page table entry in the memory associated with the page with a prevent-DMA bit that indicates whether DMA to the page is prevented, ignore the prevent-DMA bit for access to the page if page-specific DMA prevention is disabled for the IOMMU, apply permissions for access to the page as indicated by the second-level page table entry if page-specific DMA prevention is enabled for the IOMMU and the prevent-DMA bit indicates that DMA to the page is allowed, and prevent DMA access to the page if page-specific DMA prevention is enabled for the IOMMU and the prevent-DMA bit indicates that DMA to the page is prevented.

Example 12 includes the integrated circuit of any of Examples 10 to 11, wherein the circuitry is further to store a first-level page table entry in the memory associated with the page with a first prevent-DMA bit that indicates whether DMA to the page is prevented at a first level, store a second-level page table entry in the memory associated with the page with a second prevent-DMA bit that indicates whether DMA to the page is prevented at a second level, set the first prevent-DMA bit to indicate that DMA to the page is prevented at the first level to prevent DMA from an input/output device, and set the second prevent-DMA bit to indicate that DMA to the page is prevented at the second level to prevent DMA from an input/output device.

Example 13 includes the integrated circuit of any of Examples 8 to 12, wherein the circuitry is further to store one or more of a first-level page table entry and a second-level page table entry in the memory associated with the page with a read permission bit and a write permission bit for a processor request and a read-DMA permission bit and a write-DMA permission bit for an input/output request.

Example 14 includes the integrated circuit of any of Examples 8 to 13, wherein the circuitry is further to store one or more of a first-level page table entry and/or a second-level page table entry in the memory associated with the page with a prevent-processor bit to indicate whether processor access is prevented and a prevent-DMA bit to indicate whether DMA is prevented.

Example 15 includes a method, comprising sharing page tables associated with a page between a processor memory management unit (MMU) and an input/output memory management unit (IOMMU), storing a page table entry in the memory associated with the page, and separately controlling access to the page from a processor and from a direct memory access (DMA) request based on one or more fields of the stored page table entry.

Example 16 includes the method of Example 15, further comprising preventing DMA to the page based on one or more fields of the stored page table entry.

Example 17 includes the method of any of Examples 15 to 16, further comprising performing a copy-on-read operation for an input/output device access to the page based on one or more fields of the stored page table entry.

Example 18 includes the method of Example 17, further comprising storing a second-level page table entry in the memory associated with the page with a prevent-DMA bit that indicates whether DMA to the page is prevented, ignoring the prevent-DMA bit for access to the page if page-specific DMA prevention is disabled for the IOMMU, applying permissions for access to the page as indicated by the second-level page table entry if page-specific DMA prevention is enabled for the IOMMU and the prevent-DMA bit indicates that DMA to the page is allowed, and preventing DMA access to the page if page-specific DMA prevention is enabled for the IOMMU and the prevent-DMA bit indicates that DMA to the page is prevented.

Example 19 includes the method of any of Examples 17 to 18, further comprising storing a first-level page table entry in the memory associated with the page with a first prevent-DMA bit that indicates whether DMA to the page is prevented at a first level, storing a second-level page table entry in the memory associated with the page with a second prevent-DMA bit that indicates whether DMA to the page is prevented at a second level, setting the first prevent-DMA bit to indicate that DMA to the page is prevented at the first level to prevent DMA from an input/output device, and setting the second prevent-DMA bit to indicate that DMA to the page is prevented at the second level to prevent DMA from an input/output device.

Example 20 includes the method of any of Examples 15 to 19, further comprising storing one or more of a first-level page table entry and a second-level page table entry in the memory associated with the page with a read permission bit and a write permission bit for a processor request and a read-DMA permission bit and a write-DMA permission bit for an input/output request.

Example 21 includes the method of any of Examples 15 to 20, further comprising storing one or more of a first-level page table entry and a second-level page table entry in the memory associated with the page with a prevent-processor bit to indicate whether processor access is prevented and a prevent-DMA bit to indicate whether DMA is prevented.

Example 22 includes the method of any of Examples 15 to 21, further comprising returning an indication of success with no read or write permissions on a translation request for the page if, in the page table entry associated with the page, a prevent-DMA bit is set.

Example 23 includes the method of any of Examples 15 to 22, further comprising transparently migrating pages with separate processor and DMA read/write permissions in the page table entry.

Example 24 includes at least one non-transitory machine readable medium comprising a plurality of instructions that, in response to being executed on a computing device, cause the computing device to share page tables associated with a page between a processor memory management unit (MMU) and an input/output memory management unit (IOMMU), store a page table entry in the memory associated with the page, and separately control access to the page from a processor and from a direct memory access (DMA) request based on one or more fields of the stored page table entry.

Example 25 includes the at least one non-transitory machine readable medium of Example 24, comprising a plurality of further instructions that, in response to being executed on the computing device, cause the computing device to prevent DMA to the page based on one or more fields of the stored page table entry.

Example 26 includes the at least one non-transitory machine readable medium of any of Examples 24 to 25, comprising a plurality of further instructions that, in response to being executed on the computing device, cause the computing device to perform a copy-on-read operation for an input/output device access to the page based on one or more fields of the stored page table entry.

Example 27 includes the at least one non-transitory machine readable medium of Example 26, comprising a plurality of further instructions that, in response to being executed on the computing device, cause the computing device to store a second-level page table entry in the memory associated with the page with a prevent-DMA bit that indicates whether DMA to the page is prevented, ignore the prevent-DMA bit for access to the page if page-specific DMA prevention is disabled for the IOMMU, apply permissions for access to the page as indicated by the second-level page table entry if page-specific DMA prevention is enabled for the IOMMU and the prevent-DMA bit indicates that DMA to the page is allowed, and prevent DMA access to the page if page-specific DMA prevention is enabled for the IOMMU and the prevent-DMA bit indicates that DMA to the page is prevented.

Example 28 includes the at least one non-transitory machine readable medium of any of Examples 26 to 27, comprising a plurality of further instructions that, in response to being executed on the computing device, cause the computing device to store a first-level page table entry in the memory associated with the page with a first prevent-DMA bit that indicates whether DMA to the page is prevented at a first level, store a second-level page table entry in the memory associated with the page with a second prevent-DMA bit that indicates whether DMA to the page is prevented at a second level, set the first prevent-DMA bit to indicate that DMA to the page is prevented at the first level to prevent DMA from an input/output device, and set the second prevent-DMA bit to indicate that DMA to the page is prevented at the second level to prevent DMA from an input/output device.

Example 29 includes the at least one non-transitory machine readable medium of any of Examples 24 to 28, comprising a plurality of further instructions that, in response to being executed on the computing device, cause the computing device to store one or more of a first-level page table entry and a second-level page table entry in the memory associated with the page with a read permission bit and a write permission bit for a processor request and a read-DMA permission bit and a write-DMA permission bit for an input/output request.

Example 30 includes the at least one non-transitory machine readable medium of any of Examples 24 to 29, comprising a plurality of further instructions that, in response to being executed on the computing device, cause the computing device to store one or more of a first-level page table entry and a second-level page table entry in the memory associated with the page with a prevent-processor bit to indicate whether processor access is prevented and a prevent-DMA bit to indicate whether DMA is prevented.

Example 31 includes the at least one non-transitory machine readable medium of any of Examples 24 to 30, comprising a plurality of further instructions that, in response to being executed on the computing device, cause the computing device to return an indication of success with no read or write permissions on a translation request for the page if, in the page table entry associated with the page, a prevent-DMA bit is set.

Example 32 includes the at least one non-transitory machine readable medium of any of Examples 24 to 31, comprising a plurality of further instructions that, in response to being executed on the computing device, cause the computing device to transparently migrate pages with separate processor and DMA read/write permissions in the page table entry.

Example 33 includes an apparatus, comprising means for sharing page tables associated with a page between a processor memory management unit (MMU) and an input/output memory management unit (IOMMU), means for storing a page table entry in the memory associated with the page, and means for separately controlling access to the page from a processor and from a direct memory access (DMA) request based on one or more fields of the stored page table entry.

Example 34 includes the apparatus of Example 33, further comprising means for preventing DMA to the page based on one or more fields of the stored page table entry.

Example 35 includes the apparatus of any of Examples 33 to 34, further comprising means for performing a copy-on-read operation for an input/output device access to the page based on one or more fields of the stored page table entry.

Example 36 includes the apparatus of Example 35, further comprising means for storing a second-level page table entry in the memory associated with the page with a prevent-DMA bit that indicates whether DMA to the page is prevented, means for ignoring the prevent-DMA bit for access to the page if page-specific DMA prevention is disabled for the IOMMU, means for applying permissions for access to the page as indicated by the second-level page table entry if page-specific DMA prevention is enabled for the IOMMU and the prevent-DMA bit indicates that DMA to the page is allowed, and means for preventing DMA access to the page if page-specific DMA prevention is enabled for the IOMMU and the prevent-DMA bit indicates that DMA to the page is prevented.

Example 37 includes the apparatus of any of Examples 35 to 36, further comprising means for storing a first-level page table entry in the memory associated with the page with a first prevent-DMA bit that indicates whether DMA to the page is prevented at a first level, means for storing a second-level page table entry in the memory associated with the page with a second prevent-DMA bit that indicates whether DMA to the page is prevented at a second level, means for setting the first prevent-DMA bit to indicate that DMA to the page is prevented at the first level to prevent DMA from an input/output device, and means for setting the second prevent-DMA bit to indicate that DMA to the page is prevented at the second level to prevent DMA from an input/output device.

Example 38 includes the apparatus of any of Examples 33 to 37, further comprising means for storing one or more of a first-level page table entry and a second-level page table entry in the memory associated with the page with a read permission bit and a write permission bit for a processor request and a read-DMA permission bit and a write-DMA permission bit for an input/output request.

Example 39 includes the apparatus of any of Examples 33 to 38, further comprising means for storing one or more of a first-level page table entry and a second-level page table entry in the memory associated with the page with a prevent-processor bit to indicate whether processor access is prevented and a prevent-DMA bit to indicate whether DMA is prevented.

Example 40 includes the apparatus of any of Examples 33 to 39, further comprising means for returning an indication of success with no read or write permissions on a translation request for the page if, in the page table entry associated with the page, a prevent-DMA bit is set.

Example 41 includes the apparatus of any of Examples 33 to 40, further comprising means for transparently migrating pages with separate processor and DMA read/write permissions in the page table entry.

Techniques and architectures for a IOMMU are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. An apparatus, comprising:
   a memory;
   a processor core;
   a processor memory management unit (MMU) communicatively coupled to the memory and the processor core; and
   an input/output memory management unit (IOMMU) communicatively coupled to the memory and the processor core, the processor MMU and the IOMMU including circuitry to:
   share page tables associated with a page between the processor MMU and the IOMMU;
   store a page table entry in the memory associated with the page;
   separately control access to the page from the processor core and from a direct memory access (DMA) request based on one or more fields of the stored page table entry; and
   perform a copy-on-read operation for an input/output device access to the page based on the one or more fields of the stored page table entry.

2. The apparatus of claim 1, wherein the circuitry is further to:
   prevent DMA to the page based on the one or more fields of the stored page table entry.

3. The apparatus of claim 1, wherein the circuitry is further to:
   store a second-level page table entry in the memory associated with the page with a prevent-DMA bit that indicates whether DMA to the page is prevented;
   ignore the prevent-DMA bit for access to the page if page-specific DMA prevention is disabled for the IOMMU;
   apply permissions for access to the page as indicated by the second-level page table entry if the page-specific DMA prevention is enabled for the IOMMU and the prevent-DMA bit indicates that DMA to the page is allowed; and
   prevent DMA access to the page if the page-specific DMA prevention is enabled for the IOMMU and the prevent-DMA bit indicates that DMA to the page is prevented.

4. The apparatus of claim 1, wherein the circuitry is further to:
   store a first-level page table entry in the memory associated with the page with a first prevent-DMA bit that indicates whether DMA to the page is prevented at a first level;
   store a second-level page table entry in the memory associated with the page with a second prevent-DMA bit that indicates whether DMA to the page is prevented at a second level;
   set the first prevent-DMA bit to indicate that DMA to the page is prevented at the first level to prevent DMA from the input/output device; and set the second prevent-DMA bit to indicate that DMA to the page is prevented at the second level to prevent DMA from the input/output device.

5. The apparatus of claim 1, wherein the circuitry is further to:
store one or more of a first-level page table entry and a second-level page table entry in the memory associated with the page with a read permission bit and a write permission bit for a processor request and a read-DMA permission bit and a write-DMA permission bit for an input/output request.

6. The apparatus of claim 1, wherein the circuitry is further to:
store one or more of a first-level page table entry and a second-level page table entry in the memory associated with the page with a prevent-processor bit to indicate whether processor access is prevented and a prevent-DMA bit to indicate whether DMA is prevented.

7. An integrated circuit comprising circuitry to:
share page tables associated with a page between a processor memory management unit (MMU) and an input/output memory management unit (IOMMU);
store a page table entry in a memory associated with the page;
separately control access to the page from a processor and from a direct memory access (DMA) request based on one or more fields of the stored page table entry; and
perform a copy-on-read operation for an input/output access to the page based on the one or more fields of the stored page table entry.

8. The integrated circuit of claim 7, wherein the circuitry is further to:
prevent DMA to the page based on the one or more fields of the stored page table entry.

9. The integrated circuit of claim 7, wherein the circuitry is further to:
store a second-level page table entry in the memory associated with the page with a prevent-DMA bit that indicates whether DMA to the page is prevented;
ignore the prevent-DMA bit for access to the page if page-specific DMA prevention is disabled for the IOMMU;
apply permissions for access to the page as indicated by the second-level page table entry if the page-specific DMA prevention is enabled for the IOMMU and the prevent-DMA bit indicates that DMA to the page is allowed; and
prevent DMA access to the page if the page-specific DMA prevention is enabled for the IOMMU and the prevent-DMA bit indicates that DMA to the page is prevented.

10. The integrated circuit of claim 7, wherein the circuitry is further to:
store a first-level page table entry in the memory associated with the page with a first prevent-DMA bit that indicates whether DMA to the page is prevented at a first level;
store a second-level page table entry in the memory associated with the page with a second prevent-DMA bit that indicates whether DMA to the page is prevented at a second level;
set the first prevent-DMA bit to indicate that DMA to the page is prevented at the first level to prevent DMA from an input/output device; and
set the second prevent-DMA bit to indicate that DMA to the page is prevented at the second level to prevent DMA from the input/output device.

11. The integrated circuit of claim 7, wherein the circuitry is further to:
store one or more of a first-level page table entry and a second-level page table entry in the memory associated with the page with a read permission bit and a write permission bit for a processor request and a read-DMA permission bit and a write-DMA permission bit for an input/output request.

12. The integrated circuit of claim 7, wherein the circuitry is further to:
store one or more of a first-level page table entry and/or a second-level page table entry in the memory associated with the page with a prevent-processor bit to indicate whether processor access is prevented and a prevent-DMA bit to indicate whether DMA is prevented.

13. A method, comprising:
sharing page tables associated with a page between a processor memory management unit (MMU) and an input/output memory management unit (IOMMU);
storing a page table entry in a memory associated with the page;
separately controlling access to the page from a processor and from a direct memory access (DMA) request based on one or more fields of the stored page table entry; and
performing a copy-on-read operation for an input/output device access to the page based on the one or more fields of the stored page table entry.

14. The method of claim 13, further comprising:
preventing DMA to the page based on the one or more fields of the stored page table entry.

15. The method of claim 13, further comprising:
storing a second-level page table entry in the memory associated with the page with a prevent-DMA bit that indicates whether DMA to the page is prevented; and
performing one of:
ignoring the prevent-DMA bit for access to the page where it is determined that page-specific DMA prevention is disabled for the IOMMU;
applying permissions for access to the page as indicated by the second-level page table entry where it is determined that the page-specific DMA prevention is enabled for the IOMMU and wherein the prevent-DMA bit indicates that DMA to the page is allowed; or
preventing DMA access to the page where it is determined that the page-specific DMA prevention is enabled for the IOMMU and the prevent-DMA bit indicates that DMA to the page is prevented.

16. The method of claim 13, further comprising:
storing a first-level page table entry in the memory associated with the page with a first prevent-DMA bit that indicates whether DMA to the page is prevented at a first level;
storing a second-level page table entry in the memory associated with the page with a second prevent-DMA bit that indicates whether DMA to the page is prevented at a second level;
setting the first prevent-DMA bit to indicate that DMA to the page is prevented at the first level to prevent DMA from an input/output device; and
setting the second prevent-DMA bit to indicate that DMA to the page is prevented at the second level to prevent DMA from the input/output device.

17. The method of claim 13, further comprising:
storing one or more of a first-level page table entry and a second-level page table entry in the memory associated with the page with a read permission bit and a write permission bit for a processor request and a read-DMA permission bit and a write-DMA permission bit for an input/output request.

18. The method of claim 13, further comprising:
storing one or more of a first-level page table entry and a second-level page table entry in the memory associated with the page with a prevent-processor bit to indicate whether processor access is prevented and a prevent-DMA bit to indicate whether DMA is prevented.

19. The method of claim 13, further comprising:
returning an indication of success with no read or write permissions on a translation request for the page where it is determined that, in the page table entry associated with the page, a prevent-DMA bit is set.

20. The method of claim 13, further comprising:
transparently migrating pages with separate processor and DMA read/write permissions in the page table entry.

* * * * *